Jan. 31, 1967   R. J. CORSIGLIA   3,301,531
APPARATUS FOR INSTALLING ELECTRICAL WIRE IN ELECTRICAL CONDUIT
Filed April 29, 1965
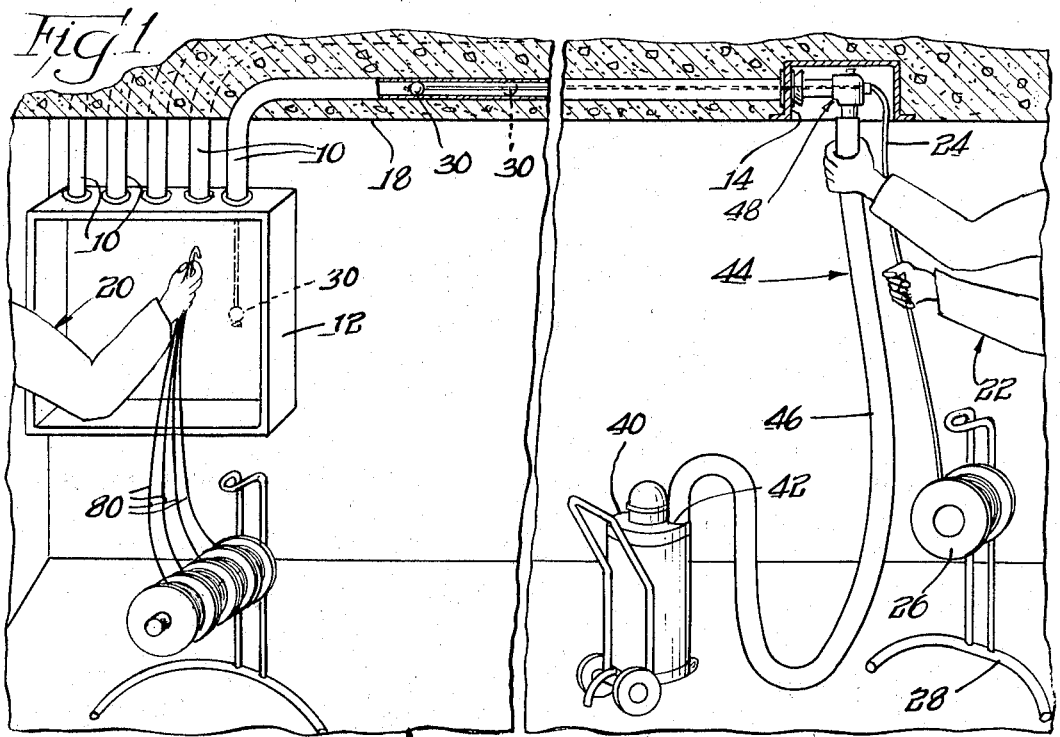
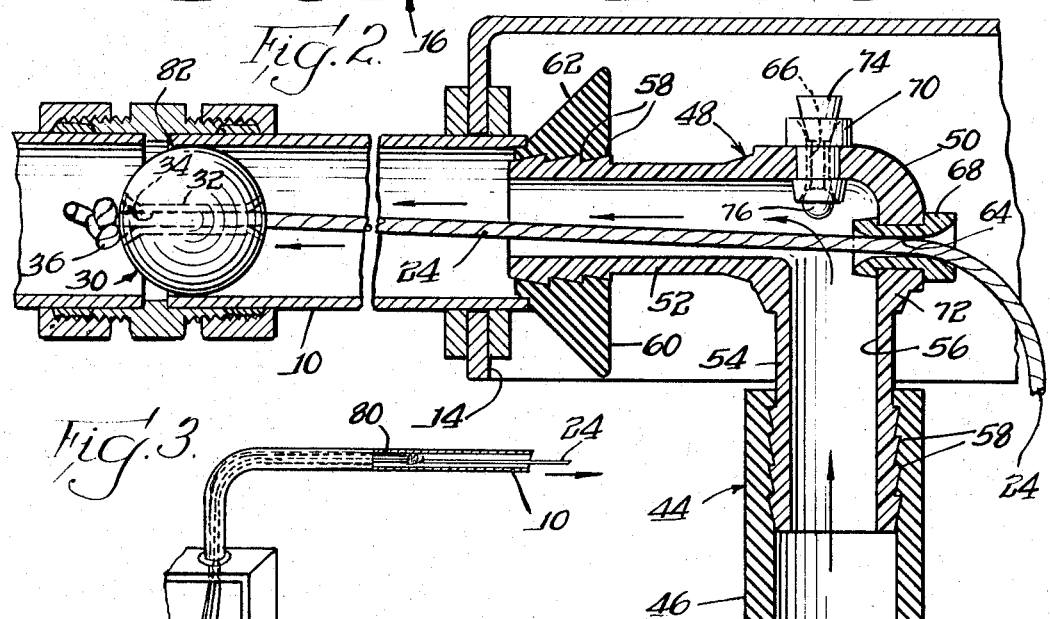
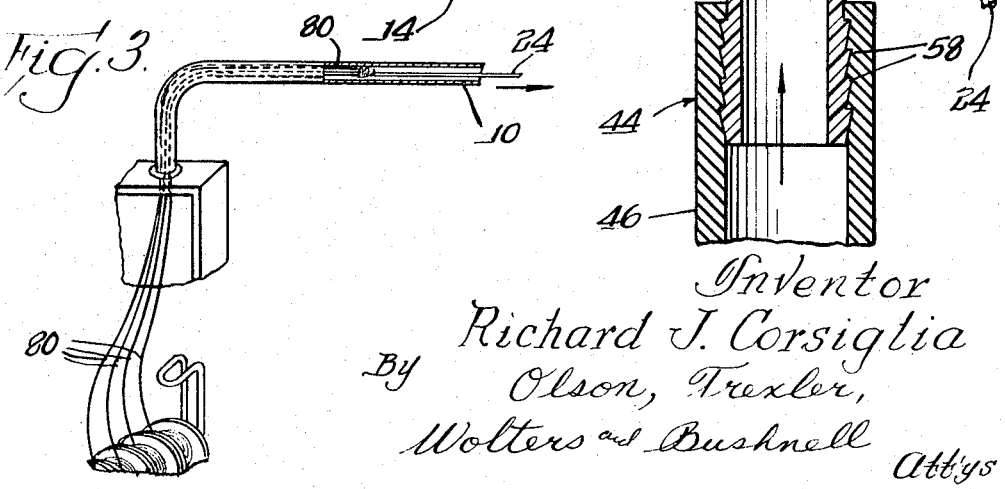
Inventor
Richard J. Corsiglia
By Olson, Trexler,
Wolters and Bushnell
Att'ys United States Patent Office 3,301,531
Patented Jan. 31, 1967

3,301,531
APPARATUS FOR INSTALLING ELECTRICAL
WIRE IN ELECTRICAL CONDUIT
Richard J. Corsiglia, 1053 N. Parkside,
Chicago, Ill. 60651
Filed Apr. 29, 1965, Ser. No. 451,817
2 Claims. (Cl. 254—134.4)

This invention relates to the placement of wires in electrical conduits installed in buildings.

In a typical building in which this invention is used to install electrical wiring, the wiring is placed in a system of hollow conduits, which for convenience will be referred to as "electrical" conduits. In such a building the electrical conduit system is first installed with no wires in the conduits, the conduits often being embedded in concrete or otherwise being visibly obscured throughout much of their length.

After an electrical conduit system is installed in a building, it becomes the job of skilled and usually highly paid electricians to place the desired electrical wiring in the conduits. In approaching this assignment electricians typically are confronted with many conduits extending from one or more central control panels to outlet boxes, or the like, dispersed throughout extensive areas of a building with the conduits partially or largely obscured within the building structure between opposite ends of the individual conduits.

Under such typical circumstances, the problem of placing wires in the conduits as required by specifications is complicated by the necessity for locating and pairing up opposite ends of each of the many electrical conduits which may be present. For instance, the electricians must determine for each conduit extending from a control panel the identity of the particular outlet box, which may be one of a large number of widely spaced outlet boxes, that contains the opposite end of the conduit.

Electricians have employed a number of somewhat different practices in placing wires in such electrical conduits in buildings. Mort of these conventional practices have been widely and extensively used by many tradesmen.

This invention involves perception that the practices previously followed by electricians in placing wires in conduits in buildings have a number of inherent inefficiencies that are time-consuming and costly.

One object of the invention is to provide, for placing wire in electrical conduits previously installed in buildings, novel and improved method and apparatus which afford an extraordinary degree of efficiency in the overall task of placing wire in the conduits in accordance with specifications.

Another object of the invention is to achieve increased efficiency and reduced labor cost in the placement of electrical wire in previously installed electrical conduit by providing novel method and apparatus for pneumatically threading into an individual conduit cord, having sufficient size and strength to pull the specified electrical wires into the conduit, in a manner such that correlation of the two ends of the conduit is effected automatically as an incident to threading of the cord into the conduit, thereby eliminating the necessity for locating more than one end of the conduit before the cord is threaded into the conduit.

A further and more specific object of the invention is to provide novel and improved method and apparatus which uses air under positive gauge pressure to pneumatically thread through an electrical conduit, only one end of which need be located in advance, a wire pulling cord having sufficient size and strength to pull the requisite electrical wiring into the conduit.

Another object is to provide, in the placement of wires in electrical conduits, increased efficiency and avoidance of time-consuming delays due to obstructions in conduits, by providing improved method and apparatus which utilizes air under positive gauge pressure to thread through an electrical conduit a strong rope or cord for pulling electrical wire into the conduit, the cord being pulled through the conduit by a movable plug under positive gauge pressure of air in such manner that the plug can be repeatedly hammered pneumatically past an obstruction in the conduit which would, except for such hammering, block free passage of the plug through the conduit.

A further object is to provide a novel and advantageous method and apparatus for threading through an electrical conduit a heavy electrical wire pulling cord in a manner which avoids the necessity for locating and identifying more than one end of the conduit before the cord is threaded into the conduit, and at the same time provides for threading through a conduit of practically unlimited length an electrical wire pulling cord of the character recited having practically any size and strength required to pull the desired number and size of electrical wires through the conduit.

Another object is to provide apparatus of the character recited in the preceding objects which is inherently well adapted to be manufactured and used in accordance with the invention at a very low manufacturing cost.

Other objects and advantages will become apparent from the following description of the invention, taken in conjunction with the drawings, in which:

FIG. 1 is a fragmentary, partially sectioned, inside view of a building showing apparatus provided by the invention, and illustrating one phase in the placement of electrical wire in a conduit in accordance with the invention;

FIG. 2 is a fragmentary sectional view on an enlarged scale showing the apparatus applied to one end of an electrical conduit and operating to pneumatically force, by air under a positive gauge pressure, a wire-pulling rope or cord through a conduit; and FIG. 3 is a fragmentary view on a reduced scale illustrating a later phase, as compared to FIG. 1 in the placement of electrical wires in a conduit.

Referring to the drawings in greater detail, FIG. 1 illustrates how two electricians working together, using the invention, complete installation of the total specified number and size of wires in a typical electrocal conduit 10 in one continuous operation involving a sequence of efficient, easy to perform steps.

As shown for the purpose of illustration in FIG. 1 a plurality of conduits 10 extend away from a common electrical panel 12 into which one end of each electrical conduit is connected as shown. Opposite ends of the electrical conduits 10 connect into individual outlet boxes 14 that are dispersed in accordance with design specifications around the building 16, only a fragmentary portion of which appears in FIG. 1. Throughout the major portion of its length, a typical conduit may be embedded in the structure 18 of the building or otherwise obscured from view. An electrical conduit system such as that just described is typical of that used in a building in which this invention is employed to install wiring as required by specifications in the conduits.

The two electricians 20, 22 (only the arms of which appear in FIG. 1) using this invention complete placement of the desired electrical wires in each conduit from start to finish in one operation. At the time the men approach the task of placing the wires in the pre-installed conduits, the men do not know where the outlet box 14 corresponding to each conduit 10 is located, and conversely do not know the exact location and identity of the opposite end of the conduit which is connected to each of the outlet boxes 14.

Using the invention the electricians 20, 22 can start threading wire-pulling cord 24 into either end of any conduit 10 without first having to locate and identify the opposite end of the conduit. The wire-pulling cord 24 must necessarily have sufficient strength to pull into the electrical conduit wires of the number and size required by design specifications. Typically four to seven, or even more electrical wires are pulled at once into a conduit. Breakage of the cord used in pulling the wire into the conduit can be a source of troublesome and costly delay.

For these reasons, the wire-pulling cord must be of sufficient caliber or size to assure that it will withstand the required tension forces under the highly abrasive action accompanying a wire-pulling operation without being subject to breakage or appreciable wear, the cord normally being used repeatedly in successive wire-pulling operations.

Wire pulling cord meeting these strength requirements is necessarily bulky, the cord being made of fiber. Moreover, as will appear, the invention provides for threading such wire-pulling cord through the longest electrical conduits used in buildings. A wire-pulling cord having the size and strength necessary for pulling electrical wires into conduits in this environment, and having a length sufficient to extend through any of the electrical conduits commonly installed in a building, necessarily has a rather large total bulk and weight overall.

The invention provides for use by the electricians 20 and 22 of wire-pulling cord 24 supplied directly from a large reel 26, or other large supply source of cord, that is located externally in relation to the cooperating apparatus used to pneumatically thread the cord through individual conduits by air under positive gauge pressure, and which reel or other source of cord is supported independently of the coacting apparatus used in the wire-pulling cord threading operation.

As shown in FIG. 1, the reel 26 of heavy wire-pulling cord is supported on a reel stand 28 adapted to support itself directly on the building floor or other underlying structural support, or to hang directly on an overhead pipe or other suitable structure (not shown) capable of sustaining the weight of the reel and stand.

The heavy wire-pulling cord 24 is pulled from the reel 26 and threaded through a typical conduit 10, as illustrated in FIGS. 1 and 2, by a cord pulling plug 30 that is forced through the conduit by air under a positive gauge pressure. The cord pulling plug 30 is dimensioned to fit slidably within the electrical conduit 10 and form in the conduit a movable barrier to the passage of air through the conduit past the plug. The electricians carry plugs of different size to fit slidably in electrical conduits of different size in the manner described, so that a positive gauge pressure of air can build up behind the plug to force it through a conduit.

The wire-pulling plug 30 includes means for detachably connecting the plug to the leading end of the wire-pulling cord 24. In the construction illustrated, the plug 30 is spherical in shape and is fashioned from a rather soft plastics material capable of sustaining the force of air pressure on the plug, while at the same time facilitating passage of the plug past obstacles in conduits by operation of the invention in a manner to be described.

In the construction shown, the means used in detachably connecting the plug 30 to the leading end of the cord 24 includes a reinforcing tube 32 fitted into the plug and defining a central bore 34 through the plug, through which the leading end of the cord 24 is extended and tied in a knot 36 providing for transmission of pulling force from the plug to the cord.

Air under positive gauge pressure for forcing the cord pulling plug 30 through an electrical conduit 10 is provided by an electrically powered air blower 40 having an outlet 42 through which the blower discharges air at a high rate under a low gauge pressure.

Air under pressure for forcing the plug 30 through a conduit 10 is transmitted from the blower outlet 42 through an air conduit 44 to one end of the electrical conduit 10 through which the wire-pulling cord 24 is threaded. The air conduit 44 comprises a flexible air hose 46 having an inlet end adapted to connect with the blower outlet 42. The air conduit 44 also includes a tubular air supply fitting 48 adapted to connect the outlet end of the air hose 46 with one end of a conduit 10 as illustrated in FIGS. 1 and 2.

In the preferred construction illustrated best in FIG. 2, the air supply fitting 48 has a medial right angled bend 50 and two straight leg portions or legs 52, 54 of materially unequal length extending from the bend 50.

The outer ends of the legs 52, 54 are dimensioned diametrically so that the end of either leg will fit into the outlet end of a hose 46, as indicated in FIG. 2, and form a seal between the hose and an air passage 56 extending through the fitting 48 between opposite ends thereof. As shown, formation of an effective air seal between the hose 46 and the fitting 48 is aided by a plurality of annular protuberances 58 formed on the fitting 48 in encircling relation to the outer end of each leg 52, 54.

A temporary connection between the outlet end of the fitting 48 and one end of a typical conduit 10 is made and sealed with the aid of a resilient sealing ring 60 adapted to be mounted in detachable encircling relation to the outlet end of the fitting leg that is not inserted in the hose 46. The sealing ring 60 can be temporarily placed on either end of the fitting 48 and removed when desired and placed on the other end of the fitting, so that the positions of the long and short legs 52, 54 of the fitting can be reversed if desired to facilitate engagement with the ends of conduits disposed in outlet boxes, and the like, of different shape and size. In some instances it may be desirable to fit the short leg 54 into the hose 46, as shown in FIGS. 1 and 2, and in other instances it may be preferable to reverse the legs 52, 54, so that the long leg 52 extends into the hose and the short leg 54 supports the ring 60.

The resilient sealing ring 60 defines an external sealing surface 62 of truncated conical shape progressively increasing in diameter in a radially inward direction, so that the surface 62 is adapted to fit against and form a seal with the ends of conduits of varying diameter. A seal between the surface 62 and the end of a conduit 10 is formed simply by holding the air supply fitting 48 so that the ring 60 presses against one end of the conduit, as shown in FIGS. 1 and 2.

As will be described presently in greater detail, the strong wire-pulling cord 24 is fed from the reel 26 into the air supply conduit 44 through an aperture in the sidewall of the air supply conduit, so that the cord passes through the air passage in the air supply conduit and out through the outlet end of the air supply conduit into the electrical conduit as the cord is pulled into the electrical conduit by the positive air pressure on the movable plug 30.

As shown best in FIG. 2, two apertures 64, 66, each dimensioned to receive the cord 24 in closely encircling relation to the latter, are formed in the bend 50 of the fitting 48 in generally parallel alignment with portions of the air passage 56 extending through the respective fitting legs 52, 54, as shown. In the preferred construction illustrated, the main body of the fitting 48 is formed of a plastics material, and the apertures 64, 66 are defined by axial bores (also denoted by the numbers 64, 66) defined in wear resistant inserts 68, 70 mounted in the plastic body 72 of the fitting 48, as shown.

Only one of the cord receiving apertures 64, 66 is used at a time, the other aperture being temporarily closed against the outflow of air by means of a removable stopper 74 formed of resilient material, and having a bulbous inner end 76 which can be retracted through the aperture, but yet, when acted on by air pressure, blocks the outflow of air through the aperture. Normally, the plug 74 is used to block the aperture aligned with the fitting inlet leg extending into the hose 46, as shown in FIG. 2.

After connecting the fitting 48 to the hose 46, and the hose 46 to the blower 40, and in preparation for placing wires in the first conduit, the electrician 22 passes the leading end of the wire pulling cord 24 from the external supply reel 26 through the aperture 64 and out through the outlet end of the air passage 56 in the fitting 48. The plug 30 is then attached to the free end of the cord 24, in this instance by running the cord through the plug bore 34 and tying the knot 36.

Going to an outlet box 48 containing the end of an unwired condit 10, or to any other location where he may find one end of an electrical conduit in which wire is to be placed, the electrician has only to insert the plug 30 into the end of the electrical conduit and hold the fitting 48 against the end of the electrical conduit to establish a temporary connection between the air conduit 44 and the electrical conduit, as illustrated in FIG. 1. The positive pressure of the air fed through the air conduit 44 into the electrical conduit behind the plug moves the plug toward the other end of the electrical conduit to pull the strong wire pulling cord 24 from the reel 26 through the aperture 64 and through the air conduit into the electrical conduit behind the moving plug. All this time, neither of the electricians may know the exact location or identity of the other end of the electrical conduit.

The fact that threading of the wire pulling cord into the electrical conduit is started and carried through without first having to identify and pair up the two ends of the electrical conduit saves the electricians from the wastage of time which might otherwise be spent in such a pre-identification and pairing of the ends of the electrical conduit.

Threading of the wire-pulling cord through the electrical conduit by the air supplied under positive gauge pressure is completed by the plug emerging from the opposite end of the conduit and popping into view, as indicated in phantom lines at the panel 12 in FIG. 1. Thus, identification and pairing of the two ends of the electrical conduit is effected automatically by the act of completing the threading of the wire-pulling cord through the electrical conduit.

The other electrician 20 has merely to remove the plug 30 from the leading end of the wire-pulling cord 24 and attach to the wire-pulling cord in place of the plug 30 the leading ends of all the wires 80 which are to be placed into the electrical conduit, in accordance with specifications. The first electrician 22 simply moves the fitting 48 away from his end of the conduit and allows the fitting to slide along the cord 24 toward the external reel 26. With the leading ends of the electrical wires 80 connected to the wire-pulling cord, the electrician 22 retracts the wire-pulling cord 24 through the electrical conduit (as shown in FIG. 3) to pull all of the electrical wires into the electrical conduit, whereupon the cord 24 is detached from the wires to complete placement of the wires in the conduit.

The plug 30 is re-attached to the leading end of the cord 24 and the operation simply repeated to wire each additional conduit.

Normally, the plug 30 will pass freely through the electrical conduit in which it is placed, a plug of appropriate size being selected for this purpose. However, it is a fact that there are in some conduits obstructions which protrude a short distance radially into the conduit. An obstruction 82 is shown in FIG. 2 at the connection between two joined segments of a conduit. Such an obstruction 82 may be sufficiently large to stop free movement of the plug through the conduit.

In this event, passage of the plug 30 can, using the invention, usually be effected by manually and pneumatically "hammering" the plug past the obstruction.

In the event that movement of the plug is blocked by an obstruction, the electrician holding the fitting 48 against one end of the conduit merely grasps the externally exposed cord 24 between the fitting 48 and the supply reel 26 and retracts the cord several inches to retract the plug from the obstruction. The cord is then released so that the pneumatic pressure again pounds the plug against the obstruction, this action being repeated several times, if necessary, to hammer the plug past the obstruction to complete the wiring operation without any significant delay. The avoidance of delay due to obstructions in conduits can save appreciable time and cost.

To aid in hammering a plug past obstructions that may be encountered, the plug can be formed of a plastic material of such character that the periphery of the plug will crumble, break away, or otherwise yield upon being hammered against an obstruction, so that the plug will with repeated hammering pass the obstruction. Plastics materials with either resilient or frangible qualities suitable for this purpose are readily available for construction of plugs 30.

While FIGS. 2 and 3 illustrate threading of the wire pulling cord into an electrical conduit from the outlet box end of the conduit, and the subsequent pulling of electrical wires into the conduit from the control panel end of the conduit, it will be appreciated that the wire pulling cord can be threaded into either end of a conduit. Thus, if desired, the plug and wire-pulling cord can be introduced into the control panel end of the conduit and the opposite end of the conduit located by emergence of the plug from the outlet box to which the conduit is connected. The practice of the invention in either case is similar.

While reference has been made to movement of the plug 30 by air under positive gauge pressure, it will be understood that the invention is not necessarily restricted to the use of air but includes the use of other gases under positive gauge pressure. Hence, the term "air," used for convenience in expression in the description and claims, will be construed to including air and equivalent gases. Moreover, it will be appreciated that the invention is not necessarily limited to use of the particular apparatus specifically illustrated, but includes the use of variants and alternatives within the spirit and scope of the invention as defined by the claims.

The invention is claimed as follows:

1. Pneumatic cord threading apparatus for threading a wire pulling cord through an electrical conduit, comprising, a blower having an outlet through which the blower forces air at a high rate under pressure, a flexible air supply hose connectable with said blower outlet to receive air under pressure from the latter, a tubular air supply fitting defining an internal air passage for transmitting air therethrough, said fitting having a generally right angle bend in the medial portion thereof and two legs of materially unequal length extending from the bend, the outer end of each leg being dimensioned to fit into the outlet end of said hose and having means encircling the adjacent end of said air passage to form a seal between the latter and the outlet end of the hose, a centrally open sealing ring shaped and dimensioned to fit in detachable encircling relation to the outer end of either of said fitting legs to form a seal therewith, said sealing ring defining an outwardly facing sealing surface of frusto-conical shape adapted to fit against and form a seal with the end of an electrical conduit when the sealing ring encircles the end of the fitting opposite from said hose, said fitting defining in said bend therein two apertures aligned with segments of said air passage in said respective fitting legs, each of said apertures opening outwardly to receive wire pulling cord from a supply of cord located outside the fitting and hose and supported independently of the fitting and hose, each of said apertures opening inwardly into the fitting to pass wire pulling cord into said air passage to pass out through the end thereof aligned with the aperture, means for closing either of said apertures selectively to block the outflow of air therethrough while wire pulling cord is moving in through the other of the apertures; a cord pulling plug including means for detachably connecting the plug to the free end of a wire pulling cord, extending from the outlet end of said air passage after passing from an external supply of cord into the air passage through the fitting aperture aligned with the outlet end of the air passage; and said cord pulling plug being shaped to fit slidably into an electrical conduit to form a movable barrier to the passage of air through the electrical conduit past the plug so that the plug is movable by air under pressure from said fitting through an electrical conduit against one end of which said sealing ring on the fitting is temporarily pressed to effect threading through the electrical conduit of wire pulling cord connected to the plug and fed through one of said apertures into said air passage in the fitting from an external supply of cord.

2. Pneumatic cord threading apparatus for threading a wire pulling cord through an electrical conduit, comprising, a tubular air supply fitting defining an internal air passage for transmitting air therethrough, said fitting having a generally right angle bend in the medial portion thereof and two legs of materially unequal length extending from the bend, the outer end of each leg being dimensioned to fit into the outlet end of an air supply hose and having means encircling the adjacent end of said air passage to form a seal between the latter and the outlet end of the hose, a centrally open sealing ring shaped and dimensioned to fit in detachable encircling relation to the outer end of either of said fitting legs to form a seal therewith; said sealing ring, when disposed in encircling relation to one end of the fitting which is used as the air outlet end thereof, defining a sealing surface extending radially outward from the fitting to be pressed against and form a seal with one end of an electrical conduit, said fitting defining in said bend therein two apertures aligned with segment of said air passage in said respective fitting legs and being dimensioned transversely to closely encircle wire pulling cord, each of said apertures opening outwardly to receive wire pulling cord from a supply of cord located outside the fitting, each of said apertures opening inwardly into the fitting to pass wire pulling cord into said air passage to pass out through the end thereof aligned with the aperture, means for closing either of said apertures selectively to block the outflow of air therethrough while wire pulling cord is moving in through the other of the apertures; a cord pulling plug including means for detachably connection the plug to the free end of a wire pulling cord, extending from the outlet end of said air passage after passing from an external supply of cord into the air passage through the fitting aperature aligned with the outlet end of the air passage; and said cord pulling plug being shaped to fit slidably into an electrical conduit to form a movable barrier to the passage of air through the electrical conduit past the plug so that the plug is movable by air under pressure from said fitting through an electrical conduit against one end of which said sealing ring on the fitting is temorarily pressed to effect threading through the electrical conduit of wire pulling cord connected to the plug and fed through one of said aperatures into said air passage in the fitting from an external supply of cord.

References Cited by the Examiner

UNITED STATES PATENTS

| 423,134 | 3/1890 | Cope | 254—134.4 |
| 979,899 | 12/1910 | Steigleder | 254—134.4 |
| 1,827,239 | 10/1931 | Kelley | 254—134.4 |
| 2,729,424 | 1/1956 | Eppensteiner | 254—134.3 |
| 2,897,524 | 8/1959 | Varner et al. | 15—104.06 X |
| 2,917,762 | 12/1959 | Xenis | 254—134.6 |

FOREIGN PATENTS

| 4,802 | 11/1927 | Australia. |
| 377,723 | 7/1932 | Great Britain. |

WILLIAM FELDMAN, *Primary Examiner.*

OTHELL M. SIMPSON, *Examiner.*